Dec. 20, 1955   W. E. DUERINGER   2,728,039
MOTOR CONTROL SYSTEMS
Filed July 12, 1950   4 Sheets-Sheet 1

INVENTOR.
WALTER E. DUERINGER
BY
Raymond W. Jenkins
ATTORNEY

Dec. 20, 1955  W. E. DUERINGER  2,728,039
MOTOR CONTROL SYSTEMS
Filed July 12, 1950  4 Sheets-Sheet 2

INVENTOR.
WALTER E. DUERINGER
BY
Raymond W. Junkins
ATTORNEY

Dec. 20, 1955  W. E. DUERINGER  2,728,039
MOTOR CONTROL SYSTEMS
Filed July 12, 1950  4 Sheets-Sheet 3

INVENTOR.
WALTER E. DUERINGER
BY
Raymond W. Junkins
ATTORNEY

United States Patent Office 2,728,039
Patented Dec. 20, 1955

2,728,039
MOTOR CONTROL SYSTEMS

Walter E. Dueringer, Shaker Heights, Ohio, assignor to Bailey Meter Company, a corporation of Delaware Application July 12, 1950, Serial No. 173,456

10 Claims. (Cl. 318—207)

My present invention relates to measuring and/or control systems, particularly of the electronic circuit type. A variable condition, quantity, quality, position or other variable which may be represented by an electrical resistance value may be continuously and instantaneously compared to a desired value and the deviation measured or used in control. The measurement so obtained may be used to effect a control of the same or another variable which contributes to the magnitude or change in magnitude of the variable being measured.

Representative of variable quantities, conditions and the like, to which my invention is directed, are such variables as rate of fluid, flow, temperature, liquid level, and pressure, although the variable may equally as well be the position in space of an object, the throttling position of a valve, or the like.

Specifically my present invention provides improvements in an electronic measuring and controlling circuit allowing a control standard value to be established in accordance with a predetermined time program. Thereafter the deviation of the actual value of the variable from the desired or programmed value is determined and used in control.

In the control art two general types of control are recognized which may be classified as "on-off" and "modulating." The type of control applicable in any particular case depends upon the conditions incident to that case, as will be appreciated by those familiar with the art. In on-off control the control element (a valve for example) is either open or closed. In modulating control the valve is positioned between its extremes of travel to modulate or throttle the rate of flow of fluid through the valve. My present invention is directed to both types of control. I am further concerned with what is known as a "floating" control wherein, upon a departure of a variable from desired value, the rate of supply of corrective agent is continuously varied until the variable returns to the desired value, and there is no relation between magnitude of the variable and rate of supply of corrective agent. In the particular electronic circuits which I will describe as embodying my present invention, the circuits may be considered as balanceable networks but they are not self-balancing. An unbalance of a network, due to variation in value of a variable condition, causes a change in some agent or variable which effects the one having caused the unbalance and thus a balance of the network may be effected indirectly through a change in the variable which first caused the unbalance.

A particular object is the incorporation in a measuring and control system of a telemetric circuit through whose agency the measuring and controlling circuit may be located at a considerable distance from the point of control or from the point of actual variation in the variable being measured or under control.

One object is to provide an improved electronic circuit arrangement sensitive to departure of a variable from a predetermined standard value for controlling an agent affecting the variable in such a manner as to return it to the predetermined standard.

Another object is to incorporate in such a circuit a programming or time establishment of desirable standard to which the control is to work. Through this agency the standard of value to be maintained may be a uniform value or may be a value which varies in a predetermined program with time.

It is a particular object of my present invention to provide improved electrical or electronic circuits useful in the time-program control of various processes to maintain variables or other conditions at desired programmed values or relationships.

Figure 3:
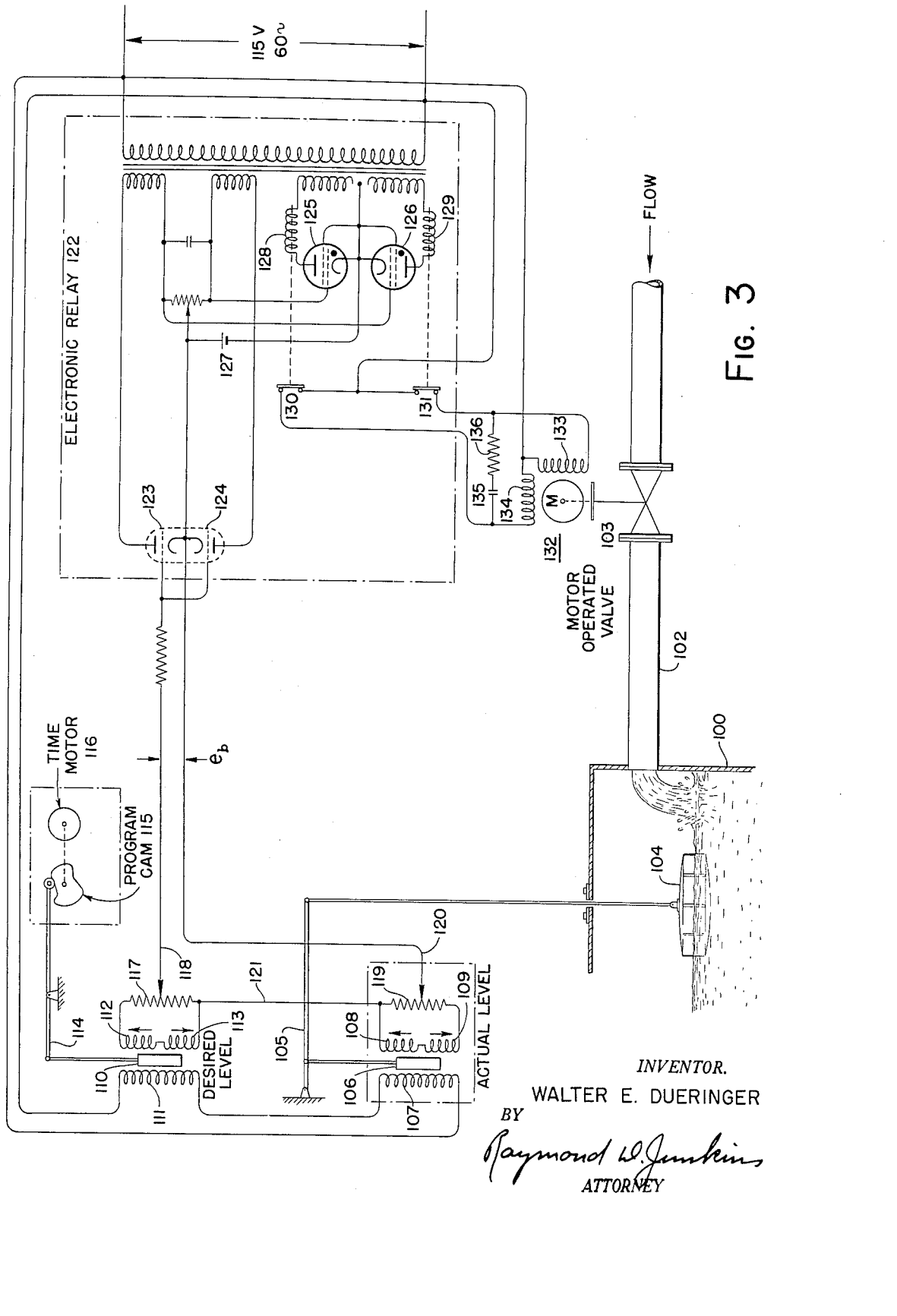

Fig. 3 diagrammatically illustrates the invention in connection with the programmed control of a liquid level.

Figs. 4, 5, 6 and 7 diagrammatically illustrate modifications of the basic circuit.

Figure 1:
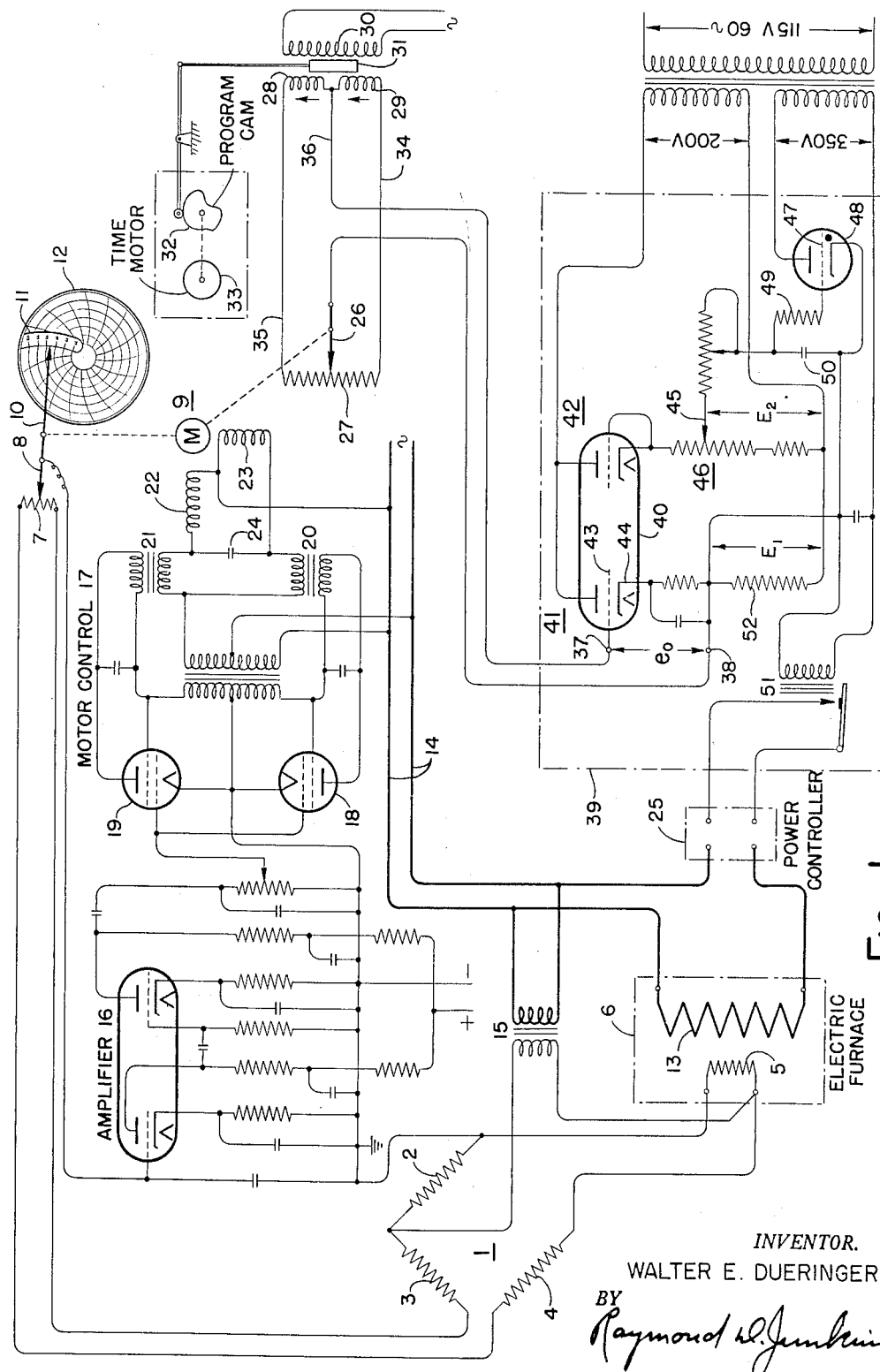
Fig. 1 is a schematic showing of a measuring and control circuit in accordance with my invention as applied to an electric furnace.
Figure 2:
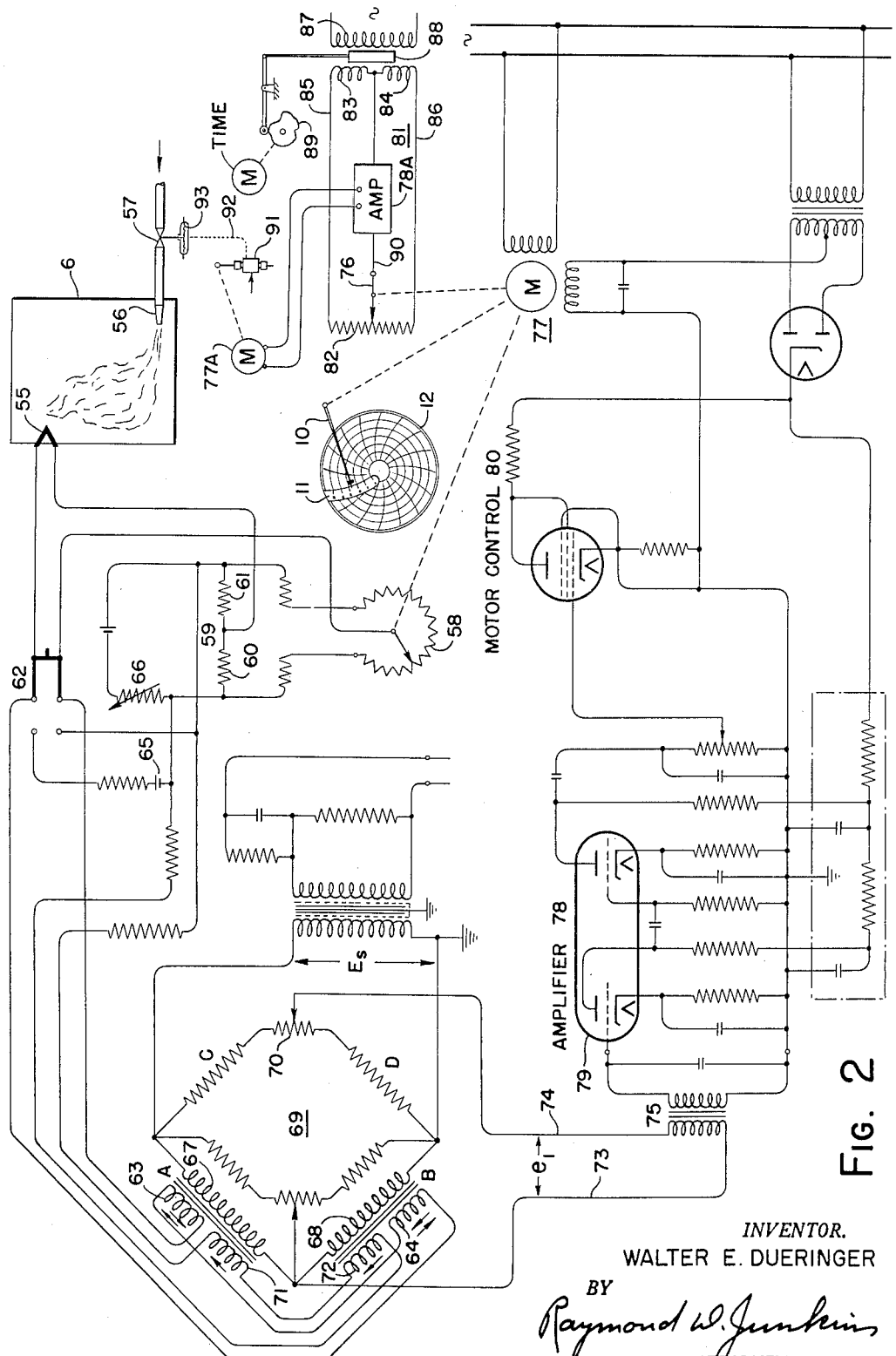
Fig. 2 is a diagrammatic showing of a measuring and controlling circuit in accordance with my invention as applied to a fuel fired furnace.

All of the figures of the drawing are shown in quite diagrammatic or schematic manner. In Figs. 1 and 2 I have shown an amplifier and motor control circuit in detail. In Figs. 1 and 3 I have shown in detail the circuits of electronic relays. I have not felt it necessary to duplicate these details in other figures which illustrate modifications of a portion only of the complete circuit.

Referring now in particular to Fig. 1, I indicate at 1 a phase sensitive A.-C. bridge having fixed resistor arms 2, 3 and 4. The fourth arm 5 of the bridge 1 is a resistance element located in an electric furnace 6 and sensitive to the temperature thereof. For balancing the bridge 1 provide an adjustable resistance 7 inserted between the arms 3 and 4 and provided with a movable contact arm 8 for proportioning the resistance 7 between the arms 3 and 4.

For positioning the contact arm 8 I provide a motor 9 which also positions an indicator 10 relative to a scale 11 and relative to a revoluble chart 12, thereby providing an instantaneous indication, as well as a continuous record, of the value of temperature to which the resistance arm 5 is sensitive.

The electric furnace 6 is preferably heated by an electric resistance element 13 receiving current from an A.-C. source 14 which also provides alternating current to the bridge 1 through a transformer 15.

Preferably the bridge arm 5 is a platinum resistance measuring element. The conjugate corners of the bridge 1 are connected to an amplifier 16 and motor control 17 for the motor 9. For an understanding of the phase sensitive A.-C. bridge for measuring the resistance of the leg 5 subjected to temperature of the furnace 6, reference may be had to the Ryder Patents 2,275,317 and 2,333,393. The voltage output of the bridge 1, supplied to the amplifier 16, assumes a balance or unbalance and a phase relation relative to the supply voltage dependent upon the magnitude and sense of the unbalance condition of the bridge. The amplifier 16 selectively controls motor tubes 18, 19 which in turn control the amount and direction of unbalance of saturable core reactors 20 and 21 for directional and speed control of the motor 9 adapted to position the arms 8 and 10.

The motor is of an A.-C. type having windings 22 and 23 ninety electrical degrees apart and also having a capacitor 24. When alternating current passes directly through one of the windings and simultaneously through the other winding in series with the capacitor, the motor rotates in predetermined direction and at a speed determined by the extent of unbalance of the saturable core reactors 20, 21. It is not necessary to go into greater detail as to the construction and operation of the amplifier 16 and the motor control circuit 17 as reference may be had to the mentioned Ryder patents.

In my present invention, in addition to providing an instantaneous indication and a continuous record of the value of temperature to which the arm 5 is subjected, I provide a electrical control of the heat input of the resistor 13 to the electric furnace 6. I have shown in this connection a power controller 25 which forms no part of the present invention. This may be any adaptable power controller for the resistance 13. My present invention resides in an electrical system intermediate the measuring system and the power controller, sensitive to the measuring system, and for turning on or off the power controller 25. Specifically I provide a system for maintaining a programmed temperature within the furnace 6 in accordance with a time-temperature predetermined program which may be incorporated in a cam or similar mechanism.

Upon departure of temperature within the furnace 6 from that which is desired and indicated by the program, the power controller 25 is turned on or off to increase or decrease the heat of the furnace tending to return the departed temperature to its desired value. The actual temperature is continuously indicated on the scale 11 and recorded on the chart 12.

Motor 9, in addition to positioning the contact 8, simultaneously positions a contact arm 26 over a slidewire 27. At 28 and 29 I indicate the secondaries of a movable core transformer having a primary 30 and a movable core 31. The core 31 is arranged to be positioned relative to the windings 28, 29, 30 through the agency of a program cam 32 angularly moved by a time motor 33. The movable core transformer with the cam 32 and motor 33 provide a means for establishing a time-program of desired temperature to be maintained within the furnace 6 through the agency of the heating element 13. Thus is established the temperature standard or control point to which the control works i. e. the temperature value which is desirably to be maintained at the sensitive arm 5.

The elements 26, 27, 28, 29, comprise what I term a balanceable control network or voltage balance bridge including the joining conductors 34 and 35. The elements 27, 35, 28, 29 and 34 are connected in a closed series loop. The contact arm 26 is arranged to be moved along and divide the resistance 27. The joining point of the windings 28, 29 is connected to a conductor 36. Thus the elements 26, 36 divide the loop into two portions, the one portion containing the winding 28, the conductor 35, and a portion of the resistance 27; the other portion of the loop containing the winding 29, the conductor 34, and the remainder of the resistance 27. The loop is supplied with alternating current inductively from the energized primary 30 through the agency of the movable core 31. When the core 31 is in its electrical neutral position relative to the windings 28, 29, 30 then the voltage induced in the winding 28 is equal to that induced in the winding 29. As the program cam 32 is angularly moved, thereby positioning the core 31, the induced voltage in the two portions of the network will be varied in accordance with the programmed shape of the cam 32.

In general, contact arm 26 is positioned relative to the slidewire 27 by the motor 9 representative of actual temperature to which the resistance arm 5 is sensitive. Core 31 is positioned relative to the windings 28 and 29 representative of the desired or programmed temperature. The network including these elements then establishes a signal $e_0$ across terminals 37, 38 of reversible phase and having a magnitude proportional to the unbalance (if any) of the loop network.

The operation is as follows. If the temperature within the furnace deviates from the desired value, then the resistance of the bridge arm 5 changes, causing an unbalance of the bridge 1 in one direction or the other dependent upon whether the actual temperature is above or below the desired temperature. The phase and magnitude of the A.-C. output of the bridge 1 follows the sense and amount of unbalance of the bridge and is applied to the amplifier 16 for control of the motor 9. Motor 9 rotates in predetermined direction and amount determined by the phase and amount of unbalance of the bridge 1 and positions the contact 8 along the slidewire 7 in proper direction to rebalance the measuring bridge. The amount of movement of the contact 8 over the slidewire 7 to bring about such a rebalancing is representative of the deviation of the actual temperature from the previous temperature and the indicator 10 continuously shows on the index 11 and chart 12 the actual temperature of the furnace.

At the same time the motor 9 has positioned the contact 26 along the slidewire 27 in consonance with the departure of the temperature from a previous temperature. With such movement of the contact arm 26 the control bridge, including the elements 27, 35, 28, 29 and 34 becomes unbalanced to a greater or lesser extent than it previously was and an electrical value $e_0$ is established across the terminals 37, 38 representative of the direction and extent of such change in unbalance. The signal $e_0$ is effective to actuate an electronic relay generally designated at 39 controlling the resistor 13 through the agency of power controller 25 in a direction tending to bring the actual furnace temperature toward the desired programmed value.

As the temperature (due to a change in heating of the resistor 13) again varies, the consequent temperature change at the resistance 5 unbalances the bridge 1 and causes the motor 9 to position the contacts 8 and 26 in proper direction and amount until the measuring bridge 1 is again balanced. The control bridge remains unbalanced until the actual change in temperature within the furnace 6, through movement of the arm 26, is the same temperature as that desired by the program cam and consequent position of the core 31 relative to the windings 28, 29 and 30. It is appreciated, of course, that this action may be more or less continuous, i. e. before the temperature comes completely to the new program value there may be other influences acting upon the furnace to prevent or to accelerate the change of temperature to this value. In other words, the measuring circuit is continuously indicating the instantaneous temperature of the furnace and the control circuit is continuously regulating the power controller 25 to maintain the temperature at the program or desired value.

I will now describe the operation of the apparatus within the dotted enclosure 39 which I term an electronic relay. Such apparatus is under the control of the signal $e_0$ for regulating the power controller 25.

The magnitude of the control impulse $e_0$ is proportional to the deviation of the measured quantity from the control setting. The sense of the unbalance depends on whether the deviation is below or above the control setting and determines the phase or polarity of the control impulse. From a steady state, an upward (on the drawing) movement of the core 31 increases the induced voltage in the winding 28 and decreases that induced in the winding 29, resulting in a signal $e_0$ of one phase and of a magnitude dependent upon the movement of the core 31. Likewise a downward movement of the core from a previous steady state will produce a signal $e_0$ of opposite phase and of a magnitude dependent upon the extent of such core movement.

The impulse is amplified or may be applied directly to the controller. The direction in which the controller operates to restore the measured quantity to the program standard is determined by the phase or polarity of the unbalance of the control bridge. A phase discriminatory device 40 is shown as a single envelope tube containing triodes 41 and 42 of which 42 is a rectifier whose function is to supply a reference D.-C. voltage $E_2$ for 41. The voltage $e_0$ at terminals 37, 38 is impressed between the grid 43 and the cathode 44 of triode 41 establishing a D.-C. voltage $E_1$ to be compared to $E_2$.

When the control bridge is in balance ($e_0=0$), i. e. when the temperature (as represented by the relative positions of 26, 27) is at the desired value (as represented by the relative positions of 31, 28, 29) triode 41 conducts a predetermined amount of current resulting in a voltage drop $E_1$. An adjustable contact 45 is manually positioned along a resistance 46 until $E_2$ is slightly less than $E_1$. The voltage difference between $E_1$ and $E_2$ is then applied to the grid 47 of a gas filled tube 48, such as a thyratron, through a resistor 49 and a capacitor 50. The negative voltage thus applied to the grid of the thyratron 48 is just large enough to prevent 48 from firing.

Inasmuch as the relay 39 being described provides an on-off control of the heating element 13, it will be appreciated that I desire to fire tube 48 and energize the mechanical relay 51 for the power controller 25 only when the temperature tends to fall below the desired program value. When the temperature increases above the desired value (or the value, through the agency of the cam, falls below the actual temperature) the tube 48 does not fire or conduct. The unbalance voltage $e_0$ on an increase in temperature above the desired value, is in phase with the plate voltage of triode 41 and gives an increase in plate current over balance condition. This results in an increase in voltage drop $E_1$ across the resistor 52.

When the temperature decreases from the value (or the program value rises) the control bridge becomes unbalanced and a voltage $e_0$ available across the terminals 37, 38 is supplied to the grid 43 of discriminator triode 41. Such voltage is out of phase with the plate voltage of 41 so that the plate current is reduced and $E_1$ becomes less than at balance. This reduces the negative voltage applied to the grid of thyratron 48 which fires, completing the circuit to energize relay 51.

Thus the relay 39 is sensitive to the phase of the voltage $e_0$ or to the direction of unbalance of the control bridge, which is the same as saying that the relay 39 is sensitive and responsive to a departure of actual temperature above or below the desired program value of temperature. The system provides an on-off control. When temperature is below the desired value then the thyratron 48 is fired, the relay 51 is energized and the power controller 25 is so activated as to increase the heat applied to the furnace 6 so that the actual temperature effective at 5 will be raised toward the desired value. If the temperature increases or is above the desired value, then the control bridge becomes unbalanced in opposite sense, applying a voltage $e_0$ of opposite phase to the relay circuit 39, thereby shutting off the thyratron 48 to shut off the heat applied to the furnace 6.

In general the measuring bridge 1 is of the balanceable type in which an unbalance of the bridge results in a movement of the motor 9 in proper direction and amount to so move the contact 8 along the resistance 7 as to balance the bridge. On the other hand, the control bridge including the elements 27, 28 and 29 is not a self-balancing bridge or network. The position of the contact arm 26 along the slidewire 27 is representative of actual temperature with the furnace. The position of the core 31 relative to the windings 28, 29 is representative of the desired temperature. The bridge will be in balance only when the two temperatures are the same. If there is a difference in the temperatures, with consequent unbalancing of the bridge, the resulting unbalance effects as actuation of power controller 25 for varying the actual temperature 5 within the furnace 6 until such temperature is equal to the programmed or desired temperature and when that is effected then the control bridge will be in balance.

It will be appreciated that the time or program cam 32 may be shaped as desired and its speed may be arranged by preselection of gearing and speed of the motor 33. If the cam 32 were circular then rotation of the cam would not result in a movement of the core 31 and the effect would be of a predetermined definite temperature standard or control point value. A desired program temperature over a given period of time may be incorporated into the shape of the cam 32 and its rotation by the motor 33 so arranged that the position of the core 31 is at the proper location relative to the windings 28, 29 to produce the predetermined or desired time-program temperature within the furnace 6.

In Fig. 2 I show a complete wiring diagram for the measurement and control of temperature within a furnace 6 through the measurement of the D.-C. voltage generated by a thermocouple 55 which is sensitive to the temperature within the furnace; the furnace being supplied by fuel through a burner 56 having a diaphragm actuated control valve 57. Desirably the temperature of the furnace is indicated on a scale 11 and recorded on a time revoluble chart 12 through the agency of a recording pen 10. The thermocouple 55 is connected in a standard potentiometer circuit including a balancing potentiometer resistance 58. The cold junction 59 is located between manganin coil 60 and nickel coil 61 comprising compensations for changes in cold junction temperature.

A double-pole double-throw switch 62 is provided for the D.-C. input. In the position shown, for normal operation, the thermocouple-potentiometer circuit is connected to the input windings 63 and 64 of the reactor converters A and B. With the switch 62 thrown to its alternate position the potentiometer circuit is disconnected and a standard cell 65 is connected for checking the system. An adjustable resistance 66 is provided in the potentiometer circuit in known manner.

The A.-C. impedance windings 67, 68 of the reactor converters A, B are connected in adjacent legs of a Wheatstone bridge 69 having opposite fixed resistance legs C and D. An adjustable resistance 70 is connected in series between the resistance C and D.

The reactor converters A, B have bias D.-C. windings 71, 72 respectively. The interaction of the D.-C. windings 63, 71 of the reactor converter A and interaction of the D.-C. windings 64, 72 of the reactor converter B controls the reactance of the A.-C. windings 67, 68. As disclosed in the Hornfeck Patent 2,447,338 the action of the reactor converter is one of changing a low level direct current signal of given polarity into a greatly amplified alternating current signal of given phase and of reversing the phase of the alternating current signal 180° when the polarity or signal of the direct current signal is reversed. This is accomplished by the alternating current bridge 69 having two fixed resistance legs C and D and the two A.-C. reactance windings 67, 68 in the remaining legs of the bridge.

The phase of the A.-C. output current or voltage depends upon the polarity of the D.-C. input circuit, while the magnitude of the A.-C. output of the bridge 69 depends upon the magnitude of the D.-C. signal. In other words, the phase of the A.-C. signal $e_1$ of the bridge 69, effective across the conductors 73, 74 upon the primary side of transformer 75, relative to the supply $E_s$ to the bridge 69, depends upon the polarity of the D.-C. input to the control windings 63, 64, while the magnitude of the signal $e_1$ applied to the primary of transformer 75 depends upon the magnitude of the D.-C. signal applied to the control windings 63, 64.

Current flow through the A.-C. windings 67, 68 is inhibited or controlled by a control of the reactance of said windings. The polarity and value of the current flow in the D.-C. windings 63, 64 is determined by the unbalance of the potentiometer measuring circuit, and the unbalance of the potentiometer measuring circuit is equal to the change of the thermocouple potential produced by a change in the temperature within the furnace 6.

For positioning the indicator pointer 10, the balancing resistance 58, and a contact arm 76, I provide a motor indicated generally by the numeral 77. Between the A.-C. output transformer 75 and motor 77 is a two-stage amplifier 78 including a double triode electron tube 79, preferably of the 6SL7 type. A departure of the thermocouple voltage from any given value produces an output of the transformer 75 proportional to the departure and of a phase dependent upon the direction of the departure. A reversal in phase of the output of the transformer 75 acts through a motor control circuit 80 to effect an operation of the motor 77 in one direction or the other to vary the potentiometer 58 in proper sense to rebalance the measuring system.

At 81 I indicate a control bridge of the balanceable type but which is not inherently self-balancing. The network 81 includes a closed series loop including a slidewire 82, secondary windings 83, 84 and conductors 85, 86. The secondary windings 83, 84 may be variably coupled to an energized primary 87 by a movable core 88 positioned by a program cam 89. As explained in connection with Fig. 1 the position of the contact arm 76 relative to the slidewire 82 is representative of actual temperature within the furnace 6. The position of the core 88 relative to the windings 83, 84 is representative of the desired or program temperature. In the conjugate conductor 90 is an amplifier 78A controlling a motor 77A in direction and extent depending upon the phase and magnitude of unbalance in the conductor 90. The motor 77A is arranged to position the movable element of a pneumatic pilot valve 91 connected by a tubing 92 with the diaphragm 93 of the control valve 57.

From a steady state, if the actual temperature as represented by the position of contact arm 76 varies, or if the desired temperature as represented by the position of core 88 varies, the control bridge 81 is unbalanced and such unbalance shows up in the conjugate conductor 90 with corresponding movement of the motor 77A for positioning the pilot 91 to change the opening of the valve 57 and thus to vary the rate of supply of fuel through the burner 56 to increase or decrease the temperature within the furnace 6 and bring the actual temperature to equality with the desired temperature.

Fig. 3 shows an embodiment of my invention including the time-program control of liquid level with a balanceable network which however is not of the self-balancing type and therefore provides what I have termed a "floating" control system.

I show in Fig. 3 a container 100 in which it is desired to maintain a predetermined uniform or programmed liquid level. It is assumed that there is a discharge from or usage of liquid out of the tank of 100 and that a supply or replenishment of the liquid is made in controllable amount through a conduit 102 under regulation of a motor operated valve 103. The position of a float 104 riding the surface of the liquid within the tank is transmitted through linkage 105 to vertically position a magnetic core 106 relative to windings 107, 108 and 109. The elements 106, 107, 108 and 109 comprise a movable core transformer with the core 106 coupling an energized primary winding 107 to the bucking secondary windings 108, 109. Voltages induced in the secondaries 108, 109 are dependent upon the vertical (on the drawing) positioning of the core 106. Within its limits of motion the position of the core 106 relative the windings 107, 108 and 109 is representative of actual level of the liquid within the tank 100. Thus the voltage condition of the windings 108, 109 is likewise representative of the actual liquid level.

A similar movable core transformer comprising the elements 110, 111, 113 produces a voltage condition in the bucking secondary windings 112, 113 representative of desired liquid level by the positioning of the core 110 vertically (on the drawing) through the agency of linkage 114 positioned by a program cam 115 which may be revolved by a time motor 116.

Across the secondaries 112, 113 is connected a resistor 117 adjustably contacted by the terminal of a conductor 118. Similarly across the secondaries 108, 109 is connected a resistor 119 adjustably contacted by the terminal of a conductor 120. When the core 106 is in a neutral position relative the windings 107, 108, 109 a voltage $E_1=0$ exists across the windings and resistor 119. When the core is moved from neutral position toward one end of the coil assembly a voltage $E_1$ is developed as a function of core position. The relation is linear over the operating range. In similar manner a voltage $E_2$ will be developed across the windings 112, 113 when the core 110 is moved from its neutral position. The contacts 118, 120 are movable respectively along the resistances 117, 119 for calibrating purposes.

The circuit including the windings 108, 109, 112, 113, the resistances 117, 119 and the conductors 118, 120, 121 comprise a balanceable network of the null type. When the network is in balance the voltage across the conductors 118, 120, namely $e_b=0$. When the network is unbalanced through movement of either core 106 or 110, the direction and extent of such unbalance is evidenced by an alternating current of plus phase or of minus phase across the conductors 118, 120, and by a voltage $e_b$ representative of the extent of unbalance.

Irrespective of the level of liquid within the tank 100, if the actual level is the desired level then the system is in balance. Under such condition the position of the core 106 relative to the windings 107, 108, 109 produces an induced voltage between the conductors 120, 121 the same as that produced across the conductors 118, 121 by the core piece 110 inductively coupling the windings 111, 112, 113; and these induced voltages cancel or balance out to a result that $e_b=0$.

If the actual level departs from the desired level then an unbalance exists between the voltage representative of actual level and that representative of the desired level and the resultant voltage $e_b$ is of a phase and magnitude representative of the direction and extent of unbalance. At 122 I diagrammatically show an electronic relay to which the unbalance voltage $e_b$ is applied for control of the motor operated valve 103.

The voltage $e_b$ is applied to a double triode 123, 124 for firing control of a pair of shielded grid thyratrons 125, 126. When the measuring network is at balance and voltage $e_b=0$ both 123, 124 are conducting and imposing a negative voltage on the grids of the thyratrons 125, 126. I include in the circuit however a D.-C. bias, for example battery 127, sufficient to at least overcome such negative grid voltage (existing at balance) and therefore allow both thyratrons to fire, energizing relays 128, 129 so that the contacts 130, 131 are closed, resulting in a plugging of the motor 132.

When the measuring system is unbalanced the phase and magnitude of the voltage $e_b$ determines which of the triodes 123 or 124 increases in current passage and which decreases. The anodes of thyratrons 125, 126 are 180° out of phase while their grids are connected together and are in phase. The one (123 or 124) which increases will drive the grid of one thyratron (125 or 126) more negative, and it will cease firing. This will cause the related relay 128 or 129 respectively to become deenergized, thus opening the contact 130 or 131 for rotation of the motor 132 in proper direction to correct the cause of the unbalance.

The motor 132 is of an alternating current type having windings 133 and 134 ninety electrical degrees apart and also having a capacitor 135. When alternating current passes directly through one of the windings and simultaneously through the other winding in series with the capacitor, the motor rotates in predetermined direction. The resistance 136 is advisable to limit condenser surge current through the contacts 130 or 131. However, the value of resistance 136 is so small that it does not affect the phase or operation of the motor 132.

The system illustrated in Fig. 3 is representative of a "floating" control wherein there is no definite throttling position of the valve 103 for each value of level of the liquid in the tank 100. There is nothing that tends to balance the electrical measuring circuit and make $e_b=0$ until the level of the liquid actually returns to the desired level. There is no speed control of the motor 132 but the magnitude of the voltage $e_b$ serves to determine the time of operation of said motor.

Figure 4:
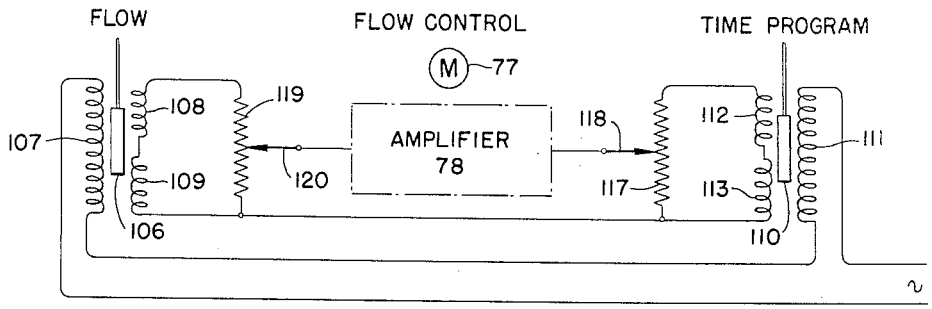

In Fig. 4 I show in simplified diagram a system somewhat similar to that of Fig. 3. In place of the electronic relay 122 (Fig. 3) connected sensitive to the unbalance $e_b$, I provide in Fig. 4 the amplifier 78 for controlling a flow control motor 77. In this embodiment the core 106 may be positioned in accordance with fluid flow, while the core 110 is positioned in accordance with a time program and any departure between actual flow and program desired flow is effected through the motor 77 for controlling the actual rate of flow.

Figure 5:
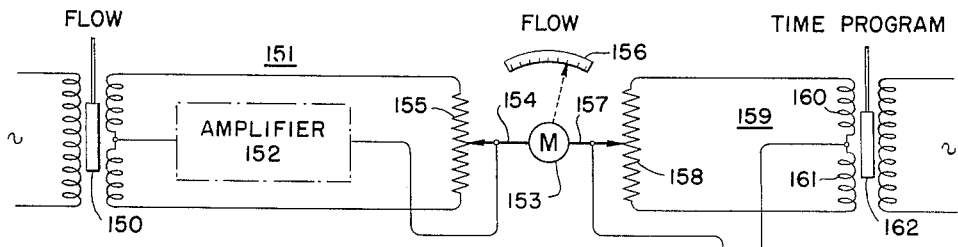

Fig. 5 illustrates a modification in which the actual flow positioning core 150 variably energizes a balanceable network 151 having an unbalance amplifier 152 controlling a balancing motor 153 which positions a contact 154 along a slidewire 155 for balancing the network 151. 153 simultaneously gives an indication of actual rate of flow on a scale 156 and additionally positions a control contact 157 along a slidewire 158, the latter forming a part of a bridge 159 which also includes the secondaries 160, 161 of a time or program arrangement represented by the position of a core 162.

In this embodiment the bridge 151 is self-balancing for giving a measurement 156 of the actual rate of flow, while the control network 159 is of the floating type balanceable only when the flow control causes the actual rate of flow to so position the element 157 as to produce a balance in the network 159.

Figure 6:
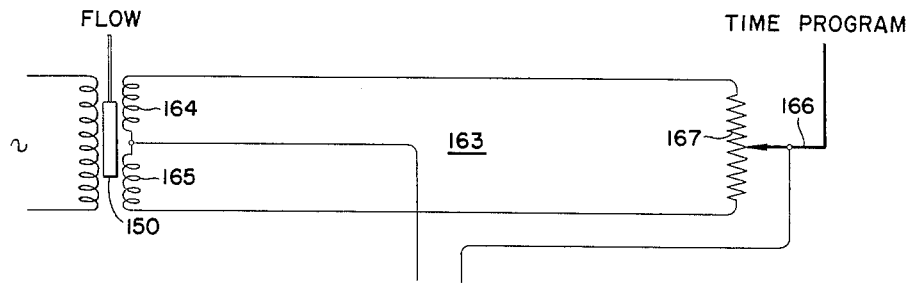

The arrangement of Fig. 6 diagrammatically shows a network 163 in which the flow element 150 is moved relative to secondaries 164, 165 while the time program mechanism positions the contact arm 166 relative to a slidewire 167. Here the control bridge 163 is of the floating type and is balanced only when the actual flow is as desired. When it is not the same as that desired then the flow control is energized by way of an electronic relay or otherwise to vary the rate of flow until balance is again restored.

Figure 7:
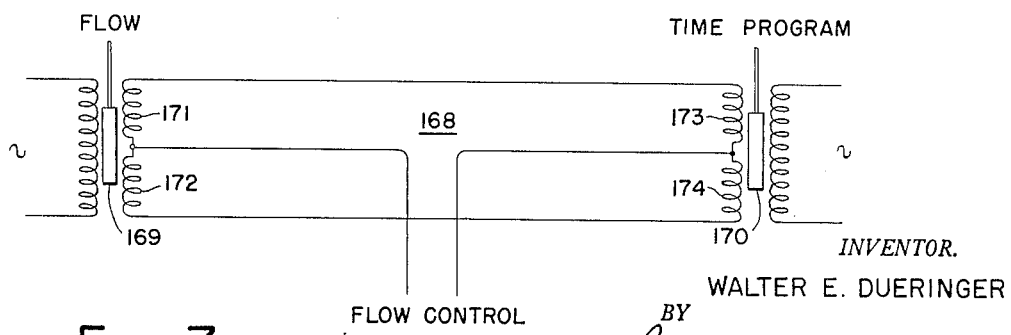

The arrangement of Fig. 7 shows a circuit wherein the network 168 has a flow movable core 169 and a time or program core 170 for varying the voltages induced in secondaries 171, 172 and 173, 174 respectively.

While I have illustrated and described certain preferred arrangements it will be noted that the various circuits and embodiments all include the primary features of controlling the value of a variable in accordance with a programmed or desired time arrangement of value and where the control network is of the floating type balanced only at such times that the actual value of the variable is the same as the desired value.

What I claim as new, and desire to secure by Letters Patent of the United States, is:

1. A control system for producing a predetermined condition, including in combination, controlled means for supplying an agent to the condition, first means responsive to the instantaneous value of the condition supplied the agent, an electro-mechanical means for producing a potential in accordance with motion, the arrangement being that the first responsive means imparts motion to the electro-mechanical means to produce a potential representative of the condition, a second means responsive to predetermined values for the condition, a movable core transformer with core responsive to the second responsive means, a balanceable network including solely the transformer and electro-mechanical means for comparing the two potentials they produce, and an electrical circuit sensitive to the direction and extent of unbalance in the network and arranged to control the agent supply means.

2. The combination of claim 1 wherein the variable is temperature and the agent is heat from an electric heating element.

3. The combination of claim 2 wherein the electro-mechanical means is a slidewire and its adjustment is effected by a slider, the first means being arranged to position the slider and the second means being arranged to position the core.

4. The combination of claim 1 wherein the circuit means includes a phase sensitive motor control.

5. The combination of claim 4 including a reversible electric motor under the control of said motor control, and regulating means controlled by said motor including a pneumatic regulator for an agent affecting the value of the variable.

6. The combination of claim 1 wherein the electro-mechanical device is a transformer and its adjustment is effected by a movable core.

7. The combination of claim 1 wherein the electro-mechanical device is a slidewire and its adjustment is effected by a slider, the first means being arranged to position the slider and the second means being arranged to position the core.

8. In a system of the type described, in combination, a pair of transformers each having an A. C. energized primary, a pair of like secondaries and a core movable to inversely change the coupling of the secondaries to the primary; each pair of secondaries being connected in series opposition through a center-tapped resistor; a connection from one end of one resistor to one end of the other; conductors extending from said center taps; an electronic relay including a pair of triodes having grids connected to one of said conductors and cathodes connected to the other, means energizing the anodes of said triodes in phase opposition from the same source of supply as said transformer primaries; a pair of thyratrons connected to be respectively triggered by the anode current of the corresponding triode; means responsive to the instantaneous value of a variable to position one of said cores; means responsive to the desired value of the variable to position the other core; means to supply a corrective agent to tend to restore the variable to its desired value, means to regulate the rate of corrective agent supply, a motor for operating said last mentioned means, and circuits placing each thyratron in control of one direction of movement of said motor.

9. In a system of the type described, in combination, a pair of transformers each having an A. C. energized primary, a pair of like secondaries and a core movable to inversely change the coupling of the secondaries to the primary; each pair of secondaries being connected in series opposition through a center-tapped resistor; a connection from one end of one resistor to one end of the other; conductors extending from said center taps; means responsive to the instantaneous value of a variable to position one of said cores; means responsive to a programmed value for said variable to position the other core; a corrective agent for adjusting the value of the variable; control means for said corrective agent; operating mechanism for said control means; a pair of thyratrons selectively and directionally in control of the operating mechanism and each having a control grid and an anode energized by A. C.; a pair of electron tubes having their grids connected to one of said conductors and their cathodes connected to the other conductor; said tubes having their plates energized in phase opposition from the source of A. C. energizing the transformers; a cathode load resistor for each of said tubes and a connection from each load resistor to the grid of a corresponding thyratron to control the bias thereof.

10. In a system of the type described, in combination, a pair of transformers each having an A. C. energized primary, a pair of like secondaries and a core movable to inversely change the coupling of the secondaries to the primary; each pair of secondaries being connected in series opposition through a center-tapped resistor, a connection from one end of one resistor to one end of the other; conductors extending from said center taps; means responsive to the instantaneous value of a variable to position one of said cores; means responsive to a programmed value for said variable to position the other core; a corrective agent for adjusting the value of the variable; control means for said corrective agent; operating mechanism for said control means; a pair of thyratrons selectively and directionally in control of the operating mechanism and each having a control grid and an anode energized by A. C.; a pair of electron tubes having their grids connected to one of said conductors and their cathodes connected to the other conductor; said tubes having their plates energized in phase opposition from the source of A. C. energizing the transformers; a cathode load resistor for each of said tubes; a source of direct current connected to provide positive bias for the thyratron grids; said positive bias for each thyratron being connected in series with a tap on the corresponding load resistor which has an equal and opposite potential when the tubes are balanced whereby both thyratrons fire when balance is present, the connections being such that increased anode current for either tube causes increased negative bias for the connected thyratron and terminates its firing.

References Cited in the file of this patent

UNITED STATES PATENTS

| | | |
|---|---|---|
| 2,491,606 | Dickey et al. | Dec. 20, 1949 |
| 2,495,844 | Hornfeck | Jan. 31, 1951 |
| 2,632,599 | Hornfeck | Mar. 24, 1953 |